United States Patent
Wittrisch et al.

(10) Patent No.: US 7,197,934 B2
(45) Date of Patent: Apr. 3, 2007

(54) PRESSURE SENSOR WITH TEMPERATURE COMPENSATED OPTICAL FIBER

(75) Inventors: Christian Wittrisch, Rueil Malmaison (FR); Laurent Maurin, Orsay (FR); Daniel Averbuch, Rueil Malmaison (FR); Pierre Ferdinand, Houilles (FR)

(73) Assignees: Institut Francais du Petrole, Rueil Malmaison Cedex (FR); Commissariat a l'Energie Atomique, Paris de Federation (FR)

( * ) Notice: Subject to any disclaimer, the term of this patent is extended or adjusted under 35 U.S.C. 154(b) by 0 days.

(21) Appl. No.: 10/520,148

(22) PCT Filed: Jun. 30, 2003

(86) PCT No.: PCT/FR03/02024

§ 371 (c)(1),
(2), (4) Date: Sep. 19, 2005

(87) PCT Pub. No.: WO2004/005876

PCT Pub. Date: Jan. 15, 2004

(65) Prior Publication Data

US 2006/0163456 A1 Jul. 27, 2006

(30) Foreign Application Priority Data

Jul. 3, 2002 (FR) .................................. 02 08344

(51) Int. Cl.
*G01J 1/04* (2006.01)
(52) U.S. Cl. .................. 73/700; 73/729.1; 385/13
(58) Field of Classification Search ................. 73/700, 73/729.1; 385/13; 250/227.14
See application file for complete search history.

(56) References Cited

U.S. PATENT DOCUMENTS 4,294,513 A * 10/1981 Nelson et al. ................. 385/4
(Continued)

FOREIGN PATENT DOCUMENTS

DE 198 60 409 A1 6/2000
(Continued)

*Primary Examiner*—Edward Lefkowitz
*Assistant Examiner*—Andre Allen
(74) *Attorney, Agent, or Firm*—Antonelli, Terry, Stout and Kraus, LLP.

(57) ABSTRACT

The present invention relates to a temperature-compensated optical fiber pressure detector for detecting pressure variations in at least one medium in relation to a reference medium such as the atmosphere or a medium where a back pressure prevails. The detector essentially comprises a deformable element (2) such as a bellows (5) exposed on one side to the reference medium and on the opposite side to the pressure to be measured, an optical fiber portion (F1) including at least one optical grating such as a Bragg grating (B1), which is connected on one side to deformable element (2) and on the opposite side to a fixed point. The optical fiber portion is subjected to a prestress by a device (6, 15, 20, 21) and its elongation varies with the displacements of the deformable element. The device applies the prestress to optical fiber portion (F1) between deformable element (2) and another fixed element (15) isolated from the medium by a rigid housing (1). An optical system (25) detects the deformations undergone by said optical grating in response to the pressure variations undergone by the deformable element. Another part (F2) of the optical fiber that is not subjected to stresses (or another non-stressed fiber portion connected to the first one) preferably comprises another similar optical grating (B2) also allowing measurement of the temperature variations. By duplicating the deformable elements and possibly the stress applying device (3), differential pressure variations can also be measured. Such a detector can notably be applied to pressure and temperature measurements in wells where difficult conditions prevail.

29 Claims, 4 Drawing Sheets

U.S. PATENT DOCUMENTS 4,432,599 A * 2/1984 McMahon ............. 250/227.14
2006/0011820 A1* 1/2006 Chow-Shing et al. .. 250/227.14
2006/0062510 A1* 3/2006 Arias Vidal et al. .......... 385/13

FOREIGN PATENT DOCUMENTS

| EP | 1 008 840 A1 | 6/2000 |
| FR | 2 674 628 A1 | 10/1992 |
| WO | WO 2004/005876 A1 | 1/2004 |

* cited by examiner

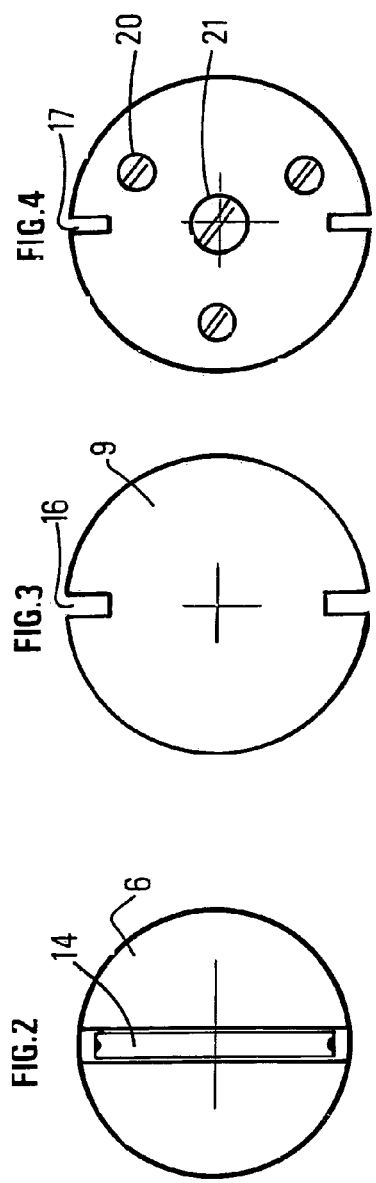
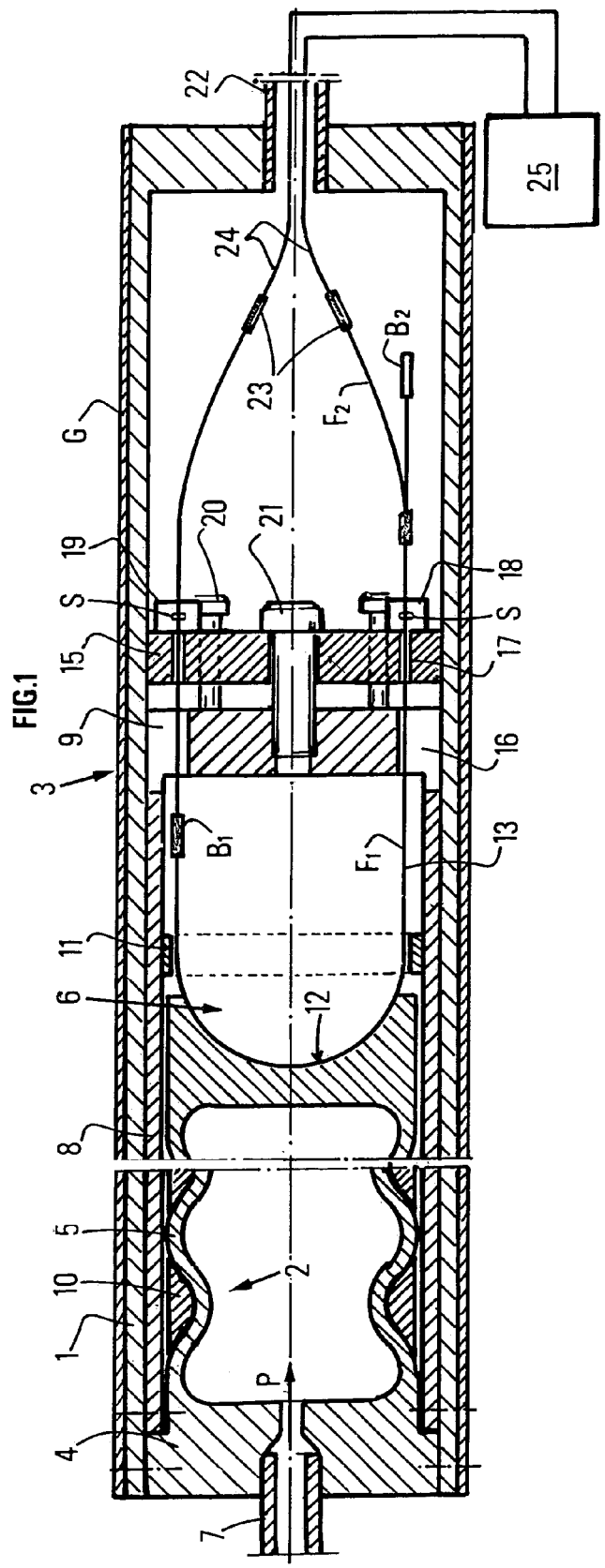

PRESSURE SENSOR WITH TEMPERATURE COMPENSATED OPTICAL FIBER

FIELD OF THE INVENTION

The present invention relates to a temperature-compensated optical fiber pressure detector.

The detector according to the invention finds applications in many spheres measurement, control, detection-alarm, monitoring, where excellent immunity to the outside environment is sought. It is particularly well-suited notably for measurement of the pressure prevailing in oil production wells. Although it can be used for pressure measurements in general, the detector is more particularly intended for very high precision measurement of the pressure variations within a fluid.

BACKGROUND OF THE INVENTION

Optical fiber detectors afford many specific advantages: limited space requirement, reduced mass, large passband and low attenuation, immunity to electromagnetic interferences, good resistance to the effects of ionizing radiations, possibility of multiplexed reading of the signals produced by various detectors and considerable measuring point offset, etc.

The prior art in this sphere can be illustrated notably by the following patents: U.S. Pat. No. 4,932,262; U.S. Pat. No. 5,317,929; U.S. Pat. No. 5,600,070; WO-99/13,307 (U.S. Pat. No. 6,016,702); WO-00/00,799; WO-01/14,843 or EP-1,008,840 A1.

The pressure detectors comprise for example one or more deformable elements (diaphragm, bellows, etc.) one surface of which is subjected to the pressure prevailing in a medium, the other surface being subjected to a reference pressure. The deformations or displacements of these elements under the effect of the pressure variations in the medium are translated into variations in the length of an optical fiber portion with Bragg gratings that connects the mobile element to a fixed housing. A detector of the same type is often associated with these pressure detectors, on an optical fiber portion that is not subjected to a stress where the grating deformations are only due to temperature variations. Standard type Bragg gratings can for example be used, whose mean spectral width is of the order of 200 pm or, for higher precision, phase jump type Bragg gratings whose spectral width is reduced to some picometers (pm), as described for example in patent application WO-9,959,009.

SUMMARY OF THE INVENTION

The optical fiber pressure detector according to the invention allows to detect pressure variations in a medium in relation to a reference medium (the atmospheric pressure for example or a back pressure). It comprises at least one deformable element (a membrane for example, or preferably a bellows whose length increases when the pressure of the medium rises) exposed on one side to the reference medium and, on the opposite side, to a pressure to be measured, and at least one optical fiber at least a portion of which is prestressed. It is therefore connected on one side to the deformable element and, on the opposite side, to a reference point so that its prestress varies with the displacements of the deformable element. This optical fiber portion comprises at least one optical grating and an optical system for detecting the deformations undergone by each optical grating as a result of the pressure variations undergone by the deformable element.

The detector is first distinguished in that it comprises a device resting on a second rigid element that constitutes the reference point, for applying an adjustable prestress to the or to each fiber portion (this second rigid element being preferably isolated from the medium by the outer housing). By means of this device, the desired prestress to be applied to the fiber can be readily adjusted locally.

According to an embodiment, the device comprises prestress means resting on the second rigid element (such as one or more rigid parts that can be moved away from this second element) and retention means associated with two opposite ends of each fiber portion which cooperate with the prestress means so as to apply an adjustable prestress to this fiber portion.

According to an embodiment, the device comprises means for giving each optical fiber portion the shape of an open loop formed between the deformable element and the retention means associated with the prestress means.

It can therefore comprise a semi-circular path (consisting for example of the groove of a pulley portion whose axle is fastened to the deformable element) associated with the deformable element, said prestress means resting against a wall of the second rigid element.

According to an embodiment, the device comprises means for giving each optical fiber portion the shape of a rectilinear fiber element formed between the deformable element and the second rigid element, the prestress means resting against this second rigid element.

Different variants can be applied to the previous two embodiments. The means for prestressing the fiber portion can for example comprise a stop piece resting against the second rigid element, and spacing means (by screwing for example) for moving the stop piece away from said second rigid element, the optical fiber portion retention means being associated with the stop piece. The prestress means can also comprise means for locking the stop piece in relation to the second rigid element.

The retention means can also comprise two mechanical latching elements suited to keep each fiber portion locked respectively at its opposite ends, one being fastened to the deformable element and the other to a part that can be translated in relation to the second rigid element, and means for adjusting to a predetermined value the prestress applied to the fiber portion.

The retention means can comprise at least one locking part embedded in the stop piece which cooperates with at least one local oversize of the optical fiber portion or at least one part set on the fiber portion, or mechanical latching elements suited to keep each fiber portion locked respectively at its opposite ends, one fastened to the deformable element and the other to the stop piece, or at least one locking part embedded in the stop piece pierced with a calibrated hole, each fiber portion being associated with each locking part by any known means (notably by sticking).

According to a preferred embodiment, the deformable element comprises a base secured to the body and a movable part (such as a bellows with corrugations of various possible shapes: symmetrical or asymmetrical, helical, with corrugation amplitudes of the inner and outer helices that can be equal or different) secured to the base, and the second rigid element comprises a rigid tube secured to the base and inside the body. Protection means are preferably added to limit deformation of the deformable element.

The detector can comprise an outer sheath made of a thermally insulating material.

According to a possible embodiment, the body is made of a material of low thermal conductivity and the elements of the detector inside the body are made of materials whose thermal conductivities are selected to best minimize the formation of thermal gradients.

According to a preferred embodiment, the detector comprises at least a second optical grating on another fiber portion that is not subjected to a prestress, so as to compensate for the stress variations due to temperature variations.

In order to best correct the effects of the temperature on the pressure measurements, the detector can comprise a plurality of optical gratings distributed over at least one fiber portion that is not subjected to a prestress, so as to detect thermal gradients inside the body, the optical system being suited to combine the measurements of the various gratings.

In order to best limit the measurement biases due to imperfections in the latching system, it is in any case preferable that the base length of the prestressed optical fiber portion is sufficiently great. The thermal expansion coefficients of the constituent elements of the detector are also preferably selected to best minimize the length variations of the prestressed fiber portion under the effect of the temperature variations.

The detector according to the invention can be readily adapted to measure relative or differential pressure variations while keeping the same adjustability performance as regards the prestress applied to the or to each fiber portion.

According to a first embodiment suitable for measuring the absolute value of a difference between two pressures, the detector comprises for example two deformable elements exposed on one side to the reference medium and, on the opposite side, respectively to two pressures to be measured, at least one optical fiber portion subjected to a prestress, which is connected on one side to one of the deformable elements and, on the opposite side, to a rigid part of the other deformable element forming said second rigid element, and whose stress varies with the displacements of the two deformable elements, this prestressed optical fiber portion comprising at least one optical grating.

According to a second embodiment suitable for measuring the amplitude and the sign of the relative variation, the detector comprises for example two deformable elements exposed on one side to the reference medium and, on the opposite side, respectively to two pressures to be measured, at least two optical fiber portions each subjected to a prior prestress, which are connected on one side respectively to the two deformable elements and, on the opposite side, to at least one reference point that is fixed, and whose respective stresses vary separately with the displacements of the two deformable elements, each one of these prestressed optical fiber portions comprising at least one optical grating.

The detector can of course comprise on each optical fiber a plurality of gratings so as to increase its resolution.

Optical fibers provided with standard or phase jump type Bragg gratings are for example used.

The pressure detector according to the invention is notably advantageous in that:
the desired fiber prestress can be readily adjusted locally by moving away a locking element,
with some of the embodiments described, it is possible, without reflection-generating parallel connection or discontinuity, to arrange several detectors in series at a distance from one another,
the mechanical elements forming the fixed reference point are preferably located within a housing and insulated from the outside pressure (not subjected to deformations).

BRIEF DESCRIPTION OF THE FIGURES

Other features and advantages of the method according to the invention will be clear from reading the description hereafter of a non limitative embodiment example, with reference to the accompanying figures wherein:

FIG. 1 diagrammatically shows a first embodiment of the pressure detector in axial section, comprising a prestressed optical fiber loop, FIG. 2 is a radial cross-sectional view of the pulley round which the optical fiber runs, FIG. 3 is a cross-sectional view of the baseplate of the inner tube, FIG. 4 is a cross-sectional view of the stop plate, FIG. 5 diagrammatically shows a first embodiment variant of the fiber-loop pressure detector, suitable for differential pressure measurement, FIG. 6 diagrammatically shows an embodiment variant of the fiber-loop pressure detector, suitable for differential pressure measurement, FIG. 7 diagrammatically shows a second embodiment of the pressure detector in axial section, comprising a prestressed linear fiber portion, FIG. 8 diagrammatically shows an embodiment variant of the pressure detector with a linear fiber portion, suitable for differential pressure measurement, FIG. 9 diagrammatically shows a mode of forming optical gratings for measuring stress and temperature variations, on two coupled optical fiber portions, FIG. 10 diagrammatically shows a variant of the mode of FIG. 9, FIG. 11 diagrammatically shows a second mode of forming optical gratings on two portions of a single optical fiber, FIG. 12 diagrammatically shows a mode of multipoint measurement of the thermal gradients within the detector body, and FIG. 13 diagrammatically shows another mode of prestressing a rectilinear fiber element.

DETAILED DESCRIPTION

Figure 5:
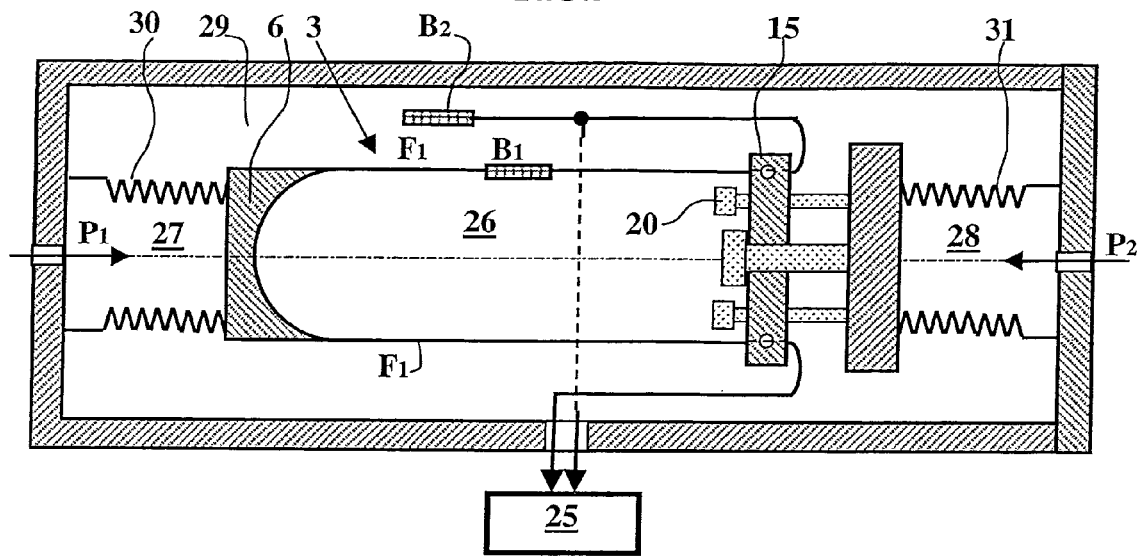

The detector according to the invention is suited to measure pressure variations in a fluid medium. It essentially comprises an outer rigid tubular housing 1 containing an element 2 deformable at least along the axis of the housing under the action of pressure variations, a stress transmission device 3 (described below) for applying a stress to at least one optical fiber portion F1 provided with at least one optical grating B1 consisting of a Bragg grating, stressed between deformable element 2 and another, fixed element isolated from the medium by rigid housing 1, and an optical system for optically detecting the deformations undergone by the optical grating as a result of the pressure variations undergone by the deformable element.

The body is preferably included in a sheath G made of a thermally insulating material so as to minimize the effects, on the measurements, of thermal gradients within the detector. This is useful in any application where the temperature of the outside medium is low or the time of exposure of the detector to a medium of relatively high temperature is short.

Deformable element 2 comprises a base 4 fastened to housing 1 inside the latter and a movable (mobile) part whose deformation is linked as it is known in the art with the pressure variations to be measured. It can be a membrane or, as shown in the preferred example, a tubular bellows 5 forming a continuation of base 4 towards the inside of housing 1 and ended by a bottom 6. The axial displacement of bottom 6 of the bellows is substantially proportional to the pressure variations. Its radial displacement is low. Its elongation variations are stable, which provides good reproducibility of the measurements in time as a function of the pressure and of the temperature.

However, if the elongation variations are not stable, it is possible to add additional temperature measurement points by means of Bragg gratings, all along the detector body, whose number is predetermined according to the desired measuring accuracy and to a known rule, so as to quantify the effect of the differential expansions induced by a temperature gradient and to correct the effects on the hydrostatic pressure measurement.

The shape and the dimensions of bellows 5, and the material from which it is made, are of course suited for the axial displacement of the deformable part to be compatible with the measurement possibilities of the Bragg grating B1 used and of the associated measuring device, and with the pressure range to be measured. The walls of bellows 5 can be of variable thickness so as to limit the stresses towards the inside in the hollows of the corrugations without penalizing the amplitude of the axial extensions. The bellows can be ring-shaped, saw-toothed, castellated, etc. The folds of bellows 5 can be axially symmetrical (forming rings) or helix-shaped to facilitate implementation.

A threaded passage 7 is provided through base 4, thus communicating the inside of bellows 5 with the medium. This communication can be direct or it can be provided by means of a more or less long tube T (fitting the threaded opening) connecting the detector to the medium where pressure P is measured.

Device 3 comprises a rigid tube 8 arranged inside housing 1. Tube 8 is fastened to base 4 at a first end and ended by a baseplate 9 at the opposite end. Bellows 5 is arranged inside rigid tube 8. Radial stops 10 can be arranged between the part and inner tube 8 so as to limit its radial deformation under the action of the outside pressure and to prevent frictions. In the case of a bellows, these radial stops 10 can be rings made of two parts housed in the corrugations of the bellows. Inner tube 8 also comprises an axial safety stop 11 to limit axial extension of the bellows under the effect of the outside pressure.

I—Prestressed Fiber Loop Detector

The bottom or base 6 of the bellows comprises a semi-circular path 12 through which an optical fiber 13 is passed. Path 12 can be delimited, for example, by the groove of a pulley portion 14 (a half pulley for example) housed in a hollow provided in the wall of bottom 6 of bellows 5. This pulley portion, whose axis is orthogonal to the axis of the bellows, is held in place on hollowed bottom 6 by fastening means that are not shown but known to the man skilled in the art, such as corner plates. It is also possible to substantially lengthen grooved bottom 6 in relation to the non limitative representation of FIG. 1, so that it reaches the position of the axle of the pulley. In this case, stop 11 has to be moved back accordingly. The pulley and its groove are dimensioned so as to induce as little friction as possible and to leave it perfectly free in rotation in order to best limit the measuring errors that might result therefrom. Pulley 14 is massive and rigid, and tightly secured to the wall of bottom 6 once set in place. Pulley portion 14 has a diameter compatible with the optical signal attenuation due to the curvature of the fiber, which is acceptable for this type of measurement.

Device 3 also comprises a plate forming a stop 15 arranged on the side of baseplate 9 opposite bellows 5. Baseplate 9 and stop plate 15 are respectively provided with holes 16, 17 that are laterally offset and facing one another, allowing passage of the strands of fiber 13 coming from either side of pulley 14. Fiber locking means 18 are used to tightly secure the fiber at the level of holes 17.

These locking means 18 can comprise, for example, local oversizes S of the core of the fiber in form of a ball or sphere cooperating with tubular elements 19 of limited inside diameter that lodges itself in holes 17 of the stop plate. These locking means 18 can also comprise for example mechanical elements such as ferrules (not shown) set on the fiber, that lock into holes 17 of stop plate 15.

It is also possible to stick the optical fiber in parts such as tubular elements 19 provided at the center thereof with a calibrated hole whose diameter is slightly larger than the outside diameter of the optical fiber, so as to limit the measurement bias induced by the shearing under stress of the glue and the fiber sheathing, this diameter of the hole being sufficient to allow the glue to flow therethrough.

The measurement bias due to the sheath or glue shear, whatever the solution selected for fastening the optical fiber, can be reduced by increasing the length of the base of prestressed fiber F1 by a sufficient length, this error being, at the first order, inversely proportional to this length.

It is also possible to use a capstan type locking device by closing one or more times the fiber loop coming from the semi-circular path (around pulley 14) by means of an opposite pulley nearby.

The stop plate comprises several bores for tension screws 20 resting against baseplate 9, allowing to move stop plate 15 away from baseplate 9 and thus to prestress the fiber in its part F1 contained in rigid inner tube 8. It is in this part that the stressed optical fiber comprises at least one optical grating B1 (Bragg grating for example) whose deformations under the effect of the pressure variations to be measured are converted to measuring signals by optical system 25. One or more lock screws 21 allow to lock stop plate 15 in relation to baseplate 9 after prestressing fiber portion F1.

Base 6 is sufficiently thick to remain practically non-deformable when the bellows deforms. This base can be added (by welding for example) to the end of the bellows. This added part can include pulley portion 14 used to send the optical fiber towards stop plate 15.

Figure 9:
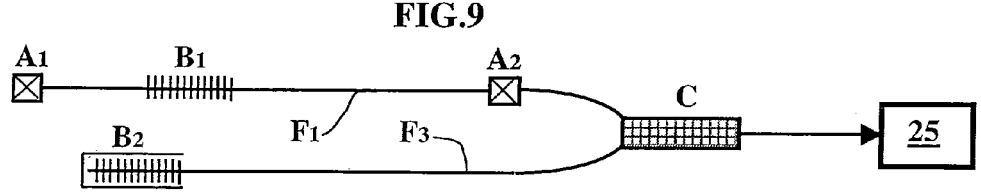
Figure 10:
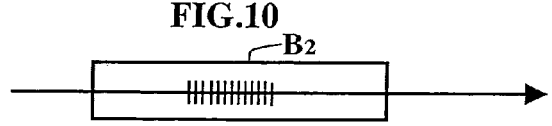
Figure 11:
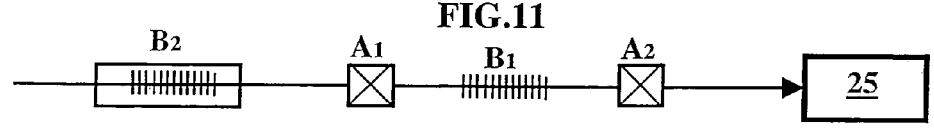

In addition to the first Bragg grating B1 sensitive both to the stress variations and to the temperature variations, the fiber preferably comprises at least a second Bragg grating B2 in a portion F2 that is not subjected to a stress, as described in connection with FIGS. 9–11. This allows to measure the local temperature variations and incidentally their gradient if the number of gratings is sufficient, and to eliminate the biases of the pressure measurements obtained by means of optical grating(s) B1 under the effect of the temperature variations.

At its end opposite base 4, the cylindrical housing is connected to a connecting tube 22. This tube is made of stainless steel for example. When the housing is externally exposed to the pressure to be measured, tube 22 is welded to the housing or connected thereto by a pressure-tight connection. On the other hand, a simple connection is sufficient if the detector is not directly exposed to the medium and receives the pressure to be measured by means of a tube T connected to base 4.

The two strands of fiber F entering and coming from tube 8 are connected by optical connectors 23 of a well-known type or preferably welded to transmission fibers 24 running through the inside of this connecting tube 22 and are connected to an optical measuring device 25 of a well-known type suited for converting the deformations of fiber portion F1 to measurements of the medium pressure variations. The inner volume of housing 1 is brought for example to a reference pressure which can be, for example, the atmospheric pressure transmitted through the inside of connecting tube 22.

Rigid inner tube 8 is not in contact with the inner wall of housing 1 likely to deform under the action of the outside pressure. Thus, the distance variations between the bottom of deformable element 2 and inside tube 8 secured to base 4 of said element are not likely to be affected by the pressure variations outside housing 1.

An embodiment using an inner tube 8 isolated against possible deformations due to the effects of the outside pressure possibly exerted around housing 1 has been described. Locking plate 15 could however rest directly against the wall of the housing in the case where this wall is either not exposed to pressure variations or sufficiently massive to withstand them without departing from the scope of the invention.

Consider for example the case of a standard Bragg grating fiber of diameter 125 μm, exclusive of sheathing. In the absence of any pressure applied to the deformable element, the fiber is brought under permanent stress with a force of the order of 0.5 daN for example, within the limit of the allowable elongation of the fiber which is of the order of 0.5% for the planned working times, considering the aging of the stressed optical fiber. The shape and the dimensions of the bellows are so selected that, at the maximum pressure to be measured, the residual stress is reduced by half for example. Any increase in the pressure of the medium is translated into a stress decrease, a shortening of fiber portion F1 and correlatively a change in the deformation of optical grating B1, which the associated measuring system 25 is going to measure. During all the stages of exposure to pressure, the stresses exerted on the fiber are lower, which contributes to reducing the effects of aging and therefore to increasing the life of the detector.

Zero adjustment of the detector is carried out for the maximum stress applied. If the zero shifts, as a result of an initial prestress variation, it can be readily corrected by acting upon plate 15.

By correlating in a well-known way the variations affecting grating B1, sensitive to both the pressure and the temperature, and grating B2 sensitive to the temperature only, separate measurements of one and the other are obtained.

I-1 Differential Pressure Detector

The pressure detector that has been described can work as a differential detector by communicating the inside of the housing with a back pressure in relation to which the pressure variations of the medium are to be measured. This is possible only if the medium exerting the back pressure is not likely to deteriorate the stressed fiber, its prestress mechanism 3 and communication fibers 24.

In the opposite case, two identical pressure detectors are used, each with a deformable element, a fiber prestressing assembly comprising at least one or two optical gratings, separately connected to the same measuring device suited to combine the measurements of the two detectors to deduce the pressure difference between their measurements.

According to the variant diagrammatically shown in FIG. 5, the differential pressure detector comprises, in a single housing 1, a central compartment 26 in which a stable reference pressure $P_0$ prevails and two lateral compartments 27, 28 communicating respectively with two media under respective pressures P1, P2. The two lateral compartments 27, 28 are respectively separated from central compartment 26 by bellows 30, 31 similar to the previous bellows 5. A device 3 (similar to the previous device 3) allows to form and to stress, between bellows 30 and 31, a open optical fiber loop F1 provided with at least two Bragg gratings B1, B2 (in layouts such as those illustrated in FIGS. 9–11) from a fiber F entering central compartment 26, connected to an optical measuring system similar to system 25. This embodiment is suitable for applications where only measurement of the absolute value of pressure difference $|P_2-P_1|$ is sought.

Figure 6:
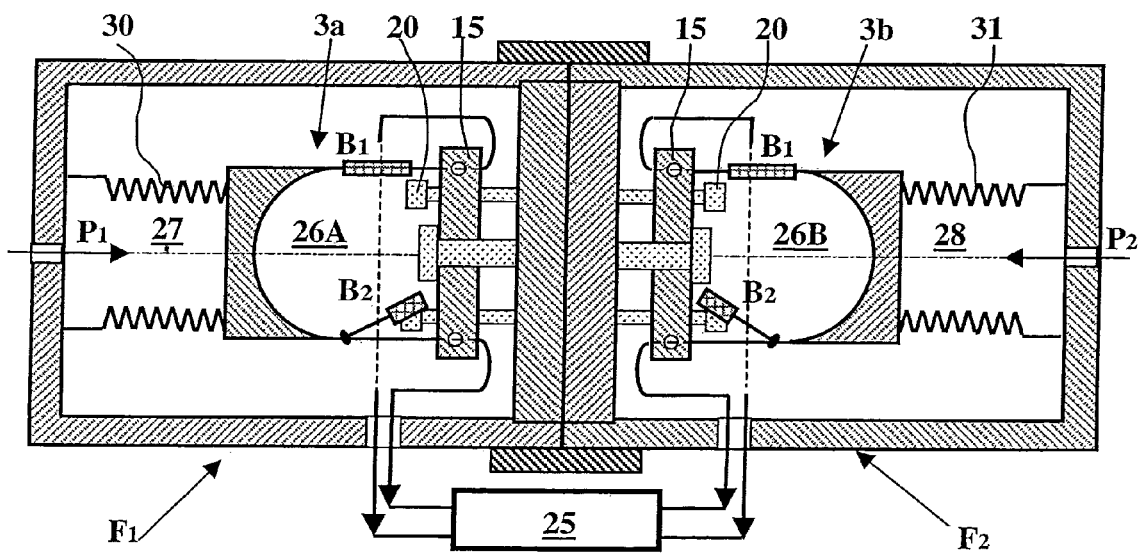

In the variant diagrammatically shown in FIG. 6, two identical pressure detectors are used, possibly in a single housing 1, each with a deformable element such as a bellows 30, 31, a device 3A, 3B for prestressing an optical fiber portion F1 forming an open loop and comprising at least one or preferably at least two optical gratings B1, B2 which are separately connected to a single measuring device 25 suited to combine the measurements of the detectors in order to deduce the positive or negative pressure difference between their respective measurements.

II Prestressed Rectilinear Fiber Portion Pressure Detector

Figure 7:
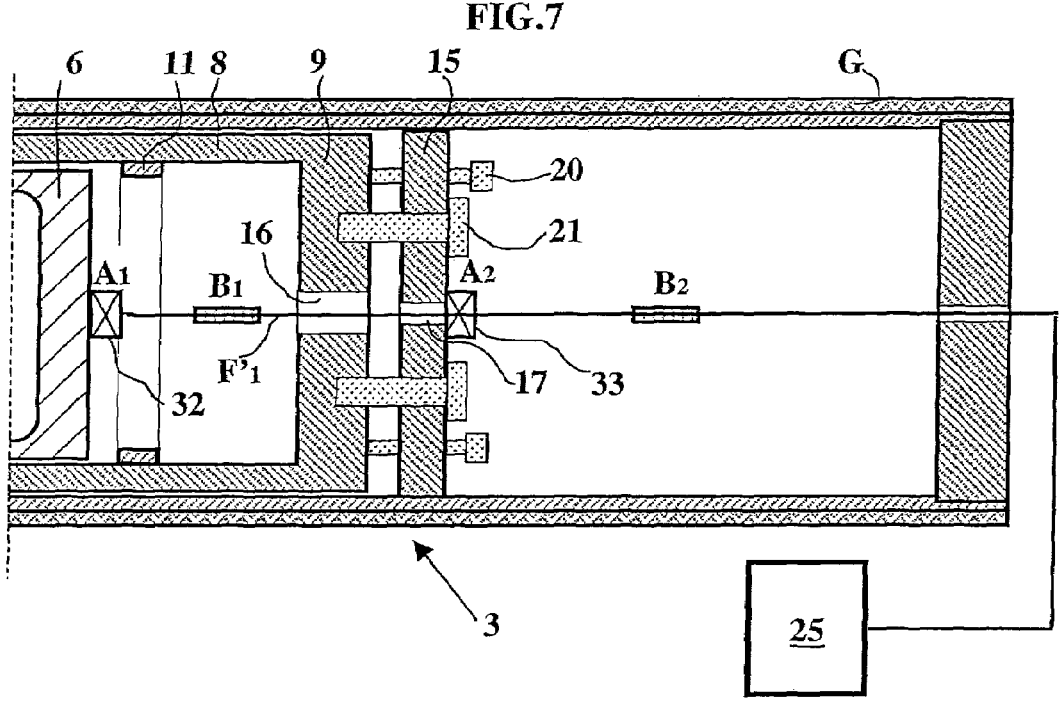

In the second embodiment of FIG. 7, the same reference numbers designate the same elements as in FIG. 1. It differs from the first one essentially in that fiber portion F1 forming a loop is here replaced by a prestressed rectilinear fiber portion F'1. At a first end, it is kept locked in a first mechanical latching means 32 of a well-known type fastened to bottom 6 of tubular bellows 5. At the opposite end, fiber portion F'1 is kept locked in a second latching element 33 fastened to mobile stop plate 15. Fiber prestress is obtained by moving the stop plate away from fixed baseplate 9 of inner tube 8. Similarly, a first Bragg grating B1 is formed on fiber portion F'1, and a second grating B2 is formed on another non-stressed portion of the fiber (see FIG. 9–11). It can be noted that the number of gratings can be increased to increase the measuring accuracy, whether pressure or temperature measurements, and to calculate the gradients.

In order to maintain fiber portion F1 stressed, it is possible to use as latching element 32 parts such as tubular elements 19 (see FIG. 1) provided at the center thereof with a calibrated hole of diameter slightly larger than the outside diameter of the optical fiber, and to immobilize the ends of the fiber portion by sticking, the diameter of the hole being sufficient to allow the glue to flow therethrough. The measurement bias induced by the shearing under stress of the glue and of the fiber sheathing is thus limited.

Similarly, the increase, by a sufficient length according to a known rule, of the base length of prestressed optical fiber F1 allows these measurement biases to be reduced.

Figure 13:
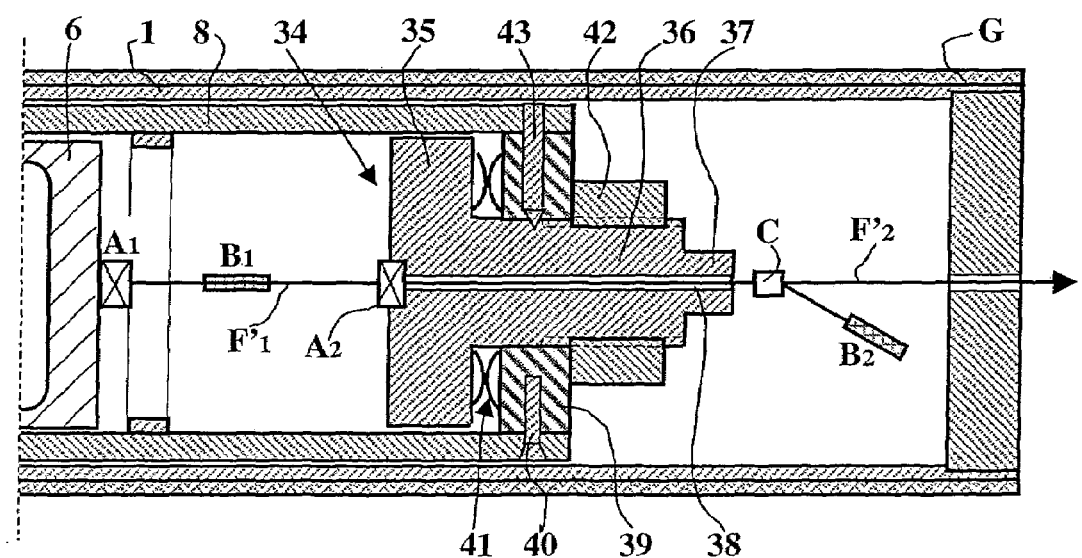

According to the embodiment of FIG. 13, tube 8 is here open at its end opposite that resting on base 4 (FIG. 1). A first element A1 for latching fiber portion F'1 is similarly secured to bottom 6 of bellows 5. The opposite fiber portion latching element A2 is secured to a cylindrical part 34 comprising a head 35 whose diameter is substantially equal to the inside diameter of tube 8, and a cylindrical extension 36 threaded over part of its length, itself continued by a terminal part 37. An axial canal 38 runs right through part 34, allowing passage of the fiber towards the outside. When part 34 is engaged in tube 8, tube 8 is closed behind it by means of an annular plate 39 that is fastened to tube 8 by radial fastening screws 40. Belleville type washers are interposed between head 35 and plate 34. A nut 42 screwed on threaded part 36 of part 34 allows, by moving the latter back, to exert an adjustable prestress on fiber portion F'1. During tightening, terminal part 37 is held in place so that the prestressed fiber portion undergoes no torsion. When the prestress is set at the predetermined value, radial screws 43 allow cylindrical part 34 to be immobilized in relation to tube 8. Nut 42 can then be immobilized by means of a counternut (not shown).

The Bragg grating B2 allowing temperature compensation of the length variations of fiber portion F'1 measured by Bragg grating B1 can be placed on a fiber portion connected (by a connector C) or welded in parallel to the non-prestressed fiber F'2. It is also possible to connect this grating B2 in series with grating B1 on a non-prestressed portion of the fiber, preferably as close as possible thereto.

The length of optical fiber F'1 between latching elements A1, A2 can be readily changed by changing the length of tube 8. This allows to minimize the influence of a possible sliding of prestressed fiber portion F'1 inside the latching elements and to increase the resolution of the detector.

II-1 Differential Pressure Detector

Figure 8:
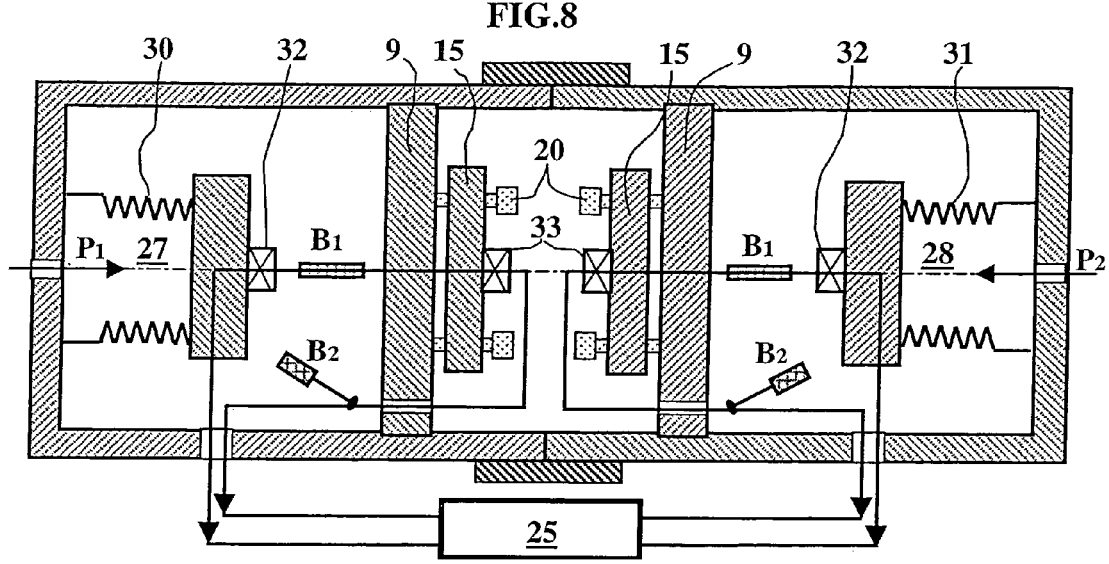

In the variant shown in FIG. 8, two identical pressure detectors are used, possibly in a single housing 1, each with a deformable element such as a bellows 30, 31, a device 3A, 3B for prestressing a rectilinear optical fiber portion F1, each prestressed between two latching elements 32, 33, which comprises at least one or preferably at least two optical gratings B1, B2, and are separately connected to a single measuring device 25 suited to combine the measurements of the two detectors so as to deduce therefrom the positive or negative pressure difference between their respective measurements.

III Detectors Setup

The second Bragg grating B2 must imperatively be formed on an optical fiber portion free from any stress so as to detect only the variations linked with the temperature variations. A setup such as those diagrammatically illustrated in FIGS. 9, 10 is used for example, where second grating B2 is formed in the vicinity of the end of a fiber portion F3 connected to fiber portion F1 (stressed between the two points A1, A2) by an optical coupler C of a well-known type. The fiber portion where grating B2 is formed can be freely installed in a microtube (FIG. 9) or stuck, prestressed, in a metal tube (FIG. 10). If there is enough room for installing Bragg grating B2 on the same fiber as grating B1, the embodiment of FIG. 11 can be selected. Grating B2 is here on the end of fiber portion F1 outside the fiber portion stressed between the two points A1, A2. This embodiment saves using an optical coupler C which causes considerable optical losses.

IV Measuring Accuracy Improvements

IV-1 Detector Sensitivity

In order to improve the sensitivity of the detector, it is possible to multiply the number of gratings and the number of optical fibers, the resolution being improved as $1/\sqrt{n}$ where n is the number of gratings used to provide the measurement.

In order to limit the measurement biases introduced by the imperfections of the latching points of prestressed fiber F1, F'1, it is advisable to best increase its length, the measurement biases being, at the first order, inversely proportional to this length.

IV-2 Correction of the Measurement Biases Due to Thermal Stresses

Body 1, rigid inner tube 8, base 4 serving as fixed reference for the elongation measurements and bellows 5 fastened thereto do not have the same length and therefore have different expansions, which may have the effect of applying parasitic differential stresses to prestressed fiber portion F1. They can be minimized by judiciously selecting the materials used for manufacturing them respectively, so that the distance between base 4 and bottom 6 of bellows 5 only depends on the pressure variations exerted on the bellows.

D and L being the unequal distances in relation to base 4 (FIG. 1) respectively of latching points A1 and A2, it is advisable to select the expansion coefficients $k_1$, $k_2$ of the metals from which bellows 5 on the one hand and tube 8 on the other are respectively made in such a way that $$\frac{L}{D} \approx \frac{k_2}{k_1}.$$

The constituent materials of the various parts of the detector are generally selected according to their thermal conductivity coefficient c so as to reduce the thermal exchanges with the outside medium and to prevent formation of thermal gradients within the detector. Materials having a high thermal conductivity are thus selected for the parts inside the detector, and materials having a lower thermal conductivity are selected for the parts in thermal contact with the outside medium.

If the compensation obtained is considered to be insufficient, considering the high measuring accuracy expected, additional compensations can be introduced by means of systematic measurements of the specific thermal expansion of each part inside the detector, using for example other Bragg gratings.

Figure 12:
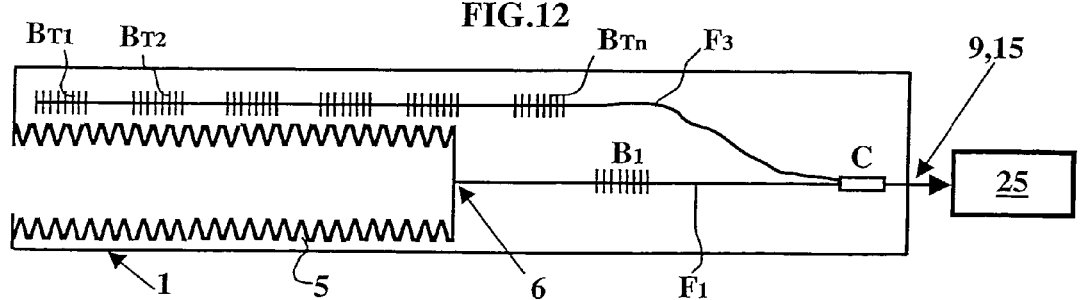

In the simplified diagram of FIG. 12, a non-stressed optical fiber portion F3 along which several gratings BT1, BT2, ..., BTn allowing to precisely measure the thermal variations of the different parts are inscribed is interposed between each bellows 5 and body 1 or intermediate rigid tube 8 (FIG. 1), this fiber portion being connected to stressed fiber portion F1 by an optical coupler C. Optical system 25 is suited to combine the measurements of the various gratings B2 in order to generate the fine correction to be applied to the pressure measurements produced by each grating B1.

V Multipoint Pressure Measurements

Several similar pressure detectors can be installed in series on transmission fibers 24 connected to measuring system 25. Each one, because of the specific pitch of the Bragg gratings B1, B2 engraved thereon, has an individual feature which allows to discriminate by multiplexing its own contribution in the light spectrum reflected by the various detectors to measuring device 25.

VI Isolation of the Bellows in Relation to the Measurement Medium

The medium in which the detector is dipped may be corrosive (chemical or electrochemical corrosion for example) to the point where the characteristics of the deformable element (membrane, bellows) change, which might distort the measurements. It is possible, in this case, to isolate the bellows from the outside fluid by using an intermediate fluid providing transmission of the pressure. This intermediate fluid is isolated from the corrosive outside fluid by a deformable membrane or bellows consisting of a material withstanding the corrosive fluid and which is in equipressure with the corrosive fluid for which the pressure is measured.

The invention claimed is:

1. An optical fiber pressure detector for detecting pressure variations in at least one medium in relation to a reference medium, comprising at least one deformable element inside a body, exposed on one side to the reference medium and, on the opposite side, to a pressure to be measured, at least one optical fiber at least a portion of which is connected on one side to deformable element and, on the opposite side, to a reference point, and whose stress varies with the displacements of the deformable element, this optical fiber portion comprising at least one optical grating, an optical system for detecting the deformations undergone by each optical grating as a result of the pressure variations undergone by the deformable element and means for adjusting the stress applied to the optical fiber, characterized in that the deformable element comprises a bellows provided with a base fastened to body, the reference point being formed by means of a device comprising a rigid tube provided with a bottom, resting at its end opposite the bottom against base of the bellows, a rigid element translatable in the direction of elongation of the optical fiber, which rests against bottom of rigid tube by means of adjustable spacing means, and retention means allowing the optical fiber portion to be fastened to rigid element.

2. A pressure detector as claimed in claim 1, wherein device comprises means for giving each optical fiber portion the shape of an open loop formed between bellows and said retention means.

3. A pressure detector as claimed in claim 2, wherein the semi-circular path consists of the groove of a pulley portion whose axle is fastened to deformable element.

4. A pressure detector as claimed in claim 1, comprising means for fastening the optical fiber portion respectively to the end of bellows and to the rigid element.

5. A pressure detector as claimed in claim 1, wherein the means for prestressing fiber portion comprise a stop plate kept away from bottom of rigid tube by adjusting screws resting against bottom, the optical fiber portion retention means being associated with this stop plate.

6. A pressure detector as claimed in claim 5, wherein the retention means comprise at least one locking means embedded in stop plate which cooperates with at least one local oversize of optical fiber portion.

7. pressure detector as claimed in claim 5, wherein the retention means comprise at least one piece set in fiber portion.

8. A pressure detector as claimed in claim 5, wherein the retention means comprise two mechanical latching elements suited to hold each fiber portion locked respectively at its opposite ends, one fastened to deformable element, the other to stop plate.

9. A pressure detector as claimed in claim 7, wherein the retention means comprise at least one locking part embedded in stop plate pierced with a calibrated hole, each fiber portion being associated by sticking with each locking part.

10. A pressure detector as claimed in claim 5, wherein the means for prestressing each fiber portion comprise means for locking stop plate in relation to bottom of rigid tube.

11. A pressure detector as claimed in claim 4, wherein the retention means comprise two mechanical latching means suited to hold each fiber portion locked respectively at its opposite ends, one fastened to the end of bellows, the other to a part translatable in relation to bottom of rigid tube, and means for adjusting to a predetermined value the prestress applied to fiber portion.

12. A pressure detector as claimed in claim 11, wherein part comprises a head and an extensions, the adjustment means comprise an added annular plate forming the bottom of rigid tube which is provided with a central opening for passage of extension, and means allowing translation of extension by screwing, resting against said annular plate.

13. A pressure detector as claimed in claim 1, comprising optical fiber elements connected to optical system.

14. A pressure detector as claimed in claim 1, wherein the bellows is arranged in body in such a way that its length increases when the pressure in the medium increases.

15. A pressure detector as claimed in claim 14, comprising protection means for limiting deformations of bellows.

16. A pressure detector as claimed in claim 14, wherein the bellows comprises symmetrical or asymmetrical corrugations.

17. A pressure detector as claimed in claim 14, wherein the corrugations of the bellows are helical, with corrugation amplitudes of the inner and outer helices that can be equal or different.

18. A pressure detector as claimed in claim 1, comprising an outer sheath made of a thermally insulating material.

19. A pressure detector as claimed in claim 1, wherein body is made of a low thermal conductivity material and the elements of the detector inside body are made from materials whose thermal conductivities are so selected as to best minimize the formation of thermal gradients.

20. A pressure detector as claimed in claim 1, comprising at least a second optical grating on another fiber portion that is not subjected to a prestress.

21. A pressure detector as claimed in claim 1, comprising a plurality of optical gratings distributed over at least one fiber portion that is not subjected to a prestress, for detecting thermal gradients within body, the optical system being suited to combine the measurements of the various gratings so as to best correct the effects of the temperature on the pressure measurements.

22. A pressure detector as claimed in claim 1, wherein the reference medium is at atmospheric pressure or a back pressure.

23. A pressure detector as claimed in claim 1, comprising two deformable elements exposed on one side to the reference medium and, on the opposite side, respectively to two pressures to be measured, at least one optical fiber portion subjected to a prestress, which is connected on one side to one of the deformable elements and, on the opposite side, to a rigid part of the other deformable element forming said second rigid element, whose stress varies with the displacements of the two deformable elements, this prestressed optical fiber portion comprising at least one optical grating.

24. A pressure detector as claimed in claim 1, comprising two deformable elements exposed on one side to the reference medium and, on the opposite side, respectively to two pressures to be measured, at least two optical fiber portions each subjected to a prior prestress, which are connected on one side respectively to the two deformable elements and, on the opposite side, to at least one reference point which is fixed, and whose respective stresses vary separately with the displacements of the two deformable elements, each one of these prestressed optical fiber portions comprising at least one optical grating.

25. A pressure detector as claimed in claim 1, comprising on each optical fiber a plurality of gratings so as to increase the resolution of the detector.

26. A pressure detector as claimed in claim 1, wherein the base length of the prestressed optical fiber portion is sufficiently great to limit the measurement biases due to imperfections in the latching system.

27. A pressure detector as claimed in claim 1, wherein optical fibers provided with standard or phase jump type Bragg gratings are used.

28. A pressure detector as claimed in claim 1, wherein the second rigid element comprises a tube isolated from the medium by outer housing.

29. A pressure detector as claimed in claim 1, wherein the thermal expansion coefficients of the constituent elements of the detector are selected so as to best minimize the length variations of prestressed fiber portion under the effect of the temperature variations.

* * * * *